Patented Dec. 9, 1947

2,432,406

UNITED STATES PATENT OFFICE 2,432,406

FRUIT TREATING SOLUTION

Ray D. Gerwe, Clearwater, and Martin A. Slade, Jr., Dunedin, Fla., assignors to Food Machinery Corporation, San Jose, Calif., a corporation of Delaware No Drawing. Application January 13, 1945, Serial No. 572,742

5 Claims. (Cl. 99—168)

1

This invention relates to the art of applying a waxy protective material dissolved in a volatile solvent to fresh whole fruit and the like whereby the material thus deposited on said fruit will reduce the shrinkage of the fruit and enhance the appearance thereof.

While the invention has other applications, it is especially useful in the method of fruit treating in which the solution is directed against the fruit in an atmosphere of fine particles as disclosed in United States Letters Patent to Sharma, No. 2,-212,621 and to Sells et al., No. 2,342,063.

This method has come into wide use in the citrus and fresh vegetable industries in the United States where it is known as "spray waxing." The protective material applied in spray waxing varies from soft waxes such as paraffin to harder waxy materials including certain polymerized resins. The solvent in which the protective material is dissolved for use in spray waxing is a highly volatile petroleum distillate, which for practical reasons preferably lies within a range of an initial boiling point of 100° F., and an end boiling point of 350° F. In the Sharma and Sells spray waxing processes an atmosphere of fine particles of the solution is formed by discharging the solution into the atmosphere through nozzles which rely entirely upon the hydraulic pressure with which the solution is supplied to the nozzles to break the latter up into fine particles suitable in size to apply these to the fruit. In the Sells process the particles of solution thus formed are rapidly conveyed in a current of air into contact with the fruit so that there is a relatively small loss of solvent by evaporation before the solution droplets engage the surface of the fruit.

Among the protective materials which have come into general use in the United States in the treatment of fresh fruit and vegetables by spray waxing has been a resin known as "cumar," the technical name for which is coumarone-indene resin. This resin is synthetically produced by polymerization, and when a clear solution of this is applied to fresh fruit and vegetables in the Sharma-Sells method it gives the fruit a beautiful natural lustre, as well as supplying an adequate degree of shrinkage control.

When the solutions of "cumar" used in this process are first made up they are ordinarily completely clear and the fruit treated thereby exhibits the unusually bright but natural appearance which this process alone appears capable of producing. After the solution stands awhile, however, as is necessary in performing the process commercially, it sometimes takes on a cloudiness

2 the true cause of which has not yet been determined. With some lots of solvent and "cumar," a similar cloudiness appears in the solution when it is first made.

The finely divided solid matter which is seen as cloudiness in the solution eventually coagulates to the point where it produces flaky particles large enough to clog the nozzles used in performing the Sharma-Sells method. These particles also collect in the delivery drums and spray tanks in sufficient quantities to stop up the screens provided to exclude sediment from the solution withdrawn from these tanks. Moreover, the fine precipitate present in cloudy solution causes the fruit treated therewith to have a much poorer lustre than is produced by the clear solution.

It is accordingly an object of this invention to provide a fruit treating solution containing a synthetic resinous product which is suitable for employment in the Sharma-Sells method aforesaid for the application of said resinous product to fresh whole fruit and the like, and which will be free from the objectionable cloudiness and precipitation of sediment above discussed.

Various theories might be propounded to explain this cloudiness phenomenon in dilute solutions of "cumar" and like resins. Extensive experiments were made to check the most likely of these theories, without, however, being able to prove any of them. While the initial cloudiness was thought to result from only partial solubility of the resin in the solvent, it is considered probable that the "cumar" is never completely dissolved, and that a considerable portion of it is merly in a very finely divided state of suspension in the solvent even when the solution is completely clear.

Although these experiments did not justify any particular theory for explaining this cloudy phenomenon, they did lead to the discovery that the condition under study is amenable to the introduction into the solution of a certain few synthetic surface active agents, out of a multitude of those which are available.

One of these agents, which is the most effective of all those tried, is known in the trade as "Aerosol OT." Chemically this is classed as a dioctyl ester of sodium sulfosuccinic acid. The introduction into a cumar solution of Aerosol OT in amounts as low as .005% by weight showed definite clearing action. In every case .05% to .10% or more of the Aerosol OT effected complete clearing the solution.

A large number of agents are rendered unsuitable for solving this problem by virtue of the fact that they are incompletely soluble in the solvent employed. Others were found to be unsuitable because they rendered the resin tacky on the fruit, which interferes with the packing of the latter, and, therefore, can not be tolerated.

As a result of this research, four synthetic surface active agents were found to be completely soluble in the solvents commonly employed commercially in the Sharma-Sells method of fruit treatment, and which also provided immediate and permanent clarity of the solution without adversely affecting the character of the resinous material after this was deposited on the fruit. The trade-names, as well as the chemical names, of these agents, which will be referred as "Group A," are as follows:

Group A

| | |
|---|---|
| Aerosol OT (100%) | Dioctyl ester of sodium sulfosuccinic acid |
| Aerosol MA | Dihexyl ester of sodium sulfosuccinic acid |
| Atlas Span 80 | Sorbitan monooleate |
| Duponol OS | Fatty alcohol sulfate |

Seven other synthetic surface active agents were discovered which, while not completely soluble in the solvent, contained only a slight amount of insoluble material. When any agent of this group had the insoluble material therein separated therefrom, it was found as suitable as any of the agents of Group A for immediate and permanent clarification of the solution. These seven agents which will be referred to as "Group B," are identified by their trade-names and their chemical names, as follows:

Group B

| | |
|---|---|
| Duponol G | Fatty alcohol sulfate |
| Naccolene F | Modified alkyl aryl sulfonate |
| Span 20 | Sorbitan monolaurate |
| Span 40 | Sorbitan monopalmitate |
| Span 60 | Sorbitan monostearate |
| Tergitol Penetrant 4 | Sodium salt of higher secondary alkyl sulfate |
| Tergitol Penetrant 7 | Sodium salt of higher secondary alkyl sulfate |

Efforts to classify agents which were found to clarify the solutions under discussion so as to distinguish these, in terms of some common characteristic, from those agents which were not suitable for this purpose, were in the main unsuccessful. It was noticed, however, that in the case of the Aerosols, those containing paraffin hydrocarbon groups of less than six carbon atoms, as for instance, amyl, butyl, and iso-propyl are not soluble in the solvent employed and have no clearing action. On the other hand, those agents with hydrocarbon groups having six or more carbon atoms, as, for instance, hexyl and octyl, are satisfactory.

The synthetic surface active agents mentioned in Groups A and B as having been found suitable for use in this invention, belong to one or the other of two chemical classes, anionic and non-ionic. Embraced in the anionic class are esters of sulfosuccinic acid, fatty alcohol sulfates, modified alkyl aryl sulfonates, and sodium salts of a higher secondary alkyl sulfate. The agents mentioned which are embraced in the non-ionic class include sorbitan monooleate, sorbitan monolaurate, sorbitan monopalmitate, and sorbitan monostearate.

While as little as .05% by weight of the Aerosol OT effected a complete clearing of all the solutions it was tried upon, it has been deemed advisable, to make sure of the results, to employ .10% of this agent in commercial solutions. Larger quantities of the agent can be employed without adverse results, up to the point where it will dilute the resin deposited on the fruit so as to make this tacky. One of the advantages of using Aerosol OT or Aerosol MA in the preferable amount noted is that they are solids and, therefore, have relatively little effect upon the character of the resin which the process leaves deposited on the fruit. Excessive quantities of the agent, such as 1% to 2% by weight are undesirable as this causes a noticeable softening of the deposited resin.

No change whatever is made necessary in the apparatus customarily employed in performing the Sharma-Sells process when it is used with the solution of this invention. This apparatus, essentially as used at present commercially, is disclosed in the patent to Sells et al. above noted.

The solvents which it has been found practical to use commercially in the Sharma-Sells process include the following:

Super V. M. & P. Naphtha
Shell Lacquer Diluent C
Standard Solvent Naphtha #14
Shell Rubber Solvent A Other synthetic resinous materials suitable for use with this invention are:

Nevindene
Durez Resin #210
Durez Resin #570
Piccolyte
Nypene Resin

A typical formula for the solution of this invention includes the following ingredients in the proportions noted:

| | Per cent |
|---|---|
| Cumar | 5.00 |
| Spermaceti wax | 0.33 |
| Cottonseed oil | 0.67 |
| Aerosol OT 100% | 0.10 |
| Petroleum distillate solvent | 93.90 |

In making up the solution for practicing the invention commercially it has been found preferable, as the first step, to prepare a concentrate containing all the ingredients of the solution except for omitting most of the solvent. The final step of forming the solution is accomplished in drums of the solvent by introducing suitable quantities of the concentrate into the drums and mixing this with the solvent therein.

The claims are:

1. A solution for applying protective material to fresh fruit which comprises a coumarone-indene resin dissolved in a highly volatile petroleum distillate solvent and an ester of sodium sulfosuccinic acid with a hydrocarbon group having at least six carbon atoms.

2. A solution for applying protective material to fresh fruit which comprises a synthetic resin dissolved in a highly volatile petroleum distillate solvent, and an ester of sodium sulfosuccinic acid with a hydrocarbon group having at least six carbon atoms.

3. A solution for applying protective material to fresh fruit which comprises a synthetic resin dissolved in a highly volatile petroleum distillate solvent and an agent selected from a group of anionic surface active agents consisting of: esters of sodium sulfosuccinic acid with a hydrocarbon group having at least six carbon atoms, fatty alcohol sulfate, modified alkyl aryl sulfonate, and a sodium salt of a higher secondary alkyl sulfate.

4. A solution for applying protective material to fresh fruit which comprises a synthetic resin dissolved in a petroleum distillate solvent having a boiling range of approximately 100° F. to 350° F., and an agent selected from a group of anionic surface active agents consisting of: esters of sodium sulfosuccinic acid with a hydrocarbon group having at least six carbon atoms, fatty alcohol sulfate, modified alkyl aryl sulfonate and a sodium salt of a higher secondary alkyl sulfate.

5. A solution for applying protective material to fresh fruit which comprises a synthetic resin dissolved in a petroleum distillate solvent having a boiling range of approximately 100° F. to 350° F., and at least .05% by weight of an agent selected from a group of anionic surface active agents consisting of: esters of sodium sulfosuccinic acid with a hydrocarbon group having at least six carbon atoms, fatty alcohol sulfate, modified alkyl aryl sulfonate, and a sodium salt of a higher secondary alkyl sulfate.

RAY D. GERWE.
MARTIN A. SLADE, Jr.

REFERENCES CITED

The following references are of record in the file of this patent:

UNITED STATES PATENTS

| Number | Name | Date |
|---|---|---|
| 2,290,452 | Sharma | July 21, 1942 |
| 2,412,686 | Kalmar | Dec. 17, 1946 |
| 2,183,981 | Bennett | Dec. 19, 1939 |
| 2,213,557 | Tisdale | Sept. 3, 1940 |
| 2,212,621 | Sharma | Aug. 27, 1940 |
| 2,324,448 | Wehrli | July 13, 1943 |
| 2,333,887 | Redlinger | Nov. 9, 1943 |